United States Patent

[11] 3,618,539

| [72] | Inventor | Jay S. Daniels<br>5901 Crown Lane, Des Moines, Iowa 50312 |
|---|---|---|
| [21] | Appl. No. | 3,722 |
| [22] | Filed | Jan. 19, 1970 |
| [45] | Patented | Nov. 9, 1971 |

[54] DEVICE FOR SUPPLYING PLANT FOOD TO PLANT ROOTS
3 Claims, 4 Drawing Figs.

[52] U.S. Cl. .................................................. 111/7.4,
239/310, 137/268
[51] Int. Cl. ....................................................... A01c 23/02
[50] Field of Search........................................... 239/276,
310, 315–316; 137/268; 111/7.1–7.4; 47/57.5, 1

[56] References Cited
UNITED STATES PATENTS

| 2,505,174 | 4/1950 | Daniels | 111/7.1 |
| 1,925,622 | 9/1933 | Anderson | 111/7.1 |
| 2,214,083 | 9/1940 | Lester | 111/7.1 X |
| 2,242,789 | 5/1941 | McFee | 111/7.1 |
| 2,302,799 | 11/1942 | Peterson | 111/7.1 X |
| 2,323,773 | 7/1943 | Irish | 111/7.1 |

*Primary Examiner*—Robert E. Bagwill
*Attorney*—Rudolph L. Lowell

ABSTRACT: The plant root feeding device includes a body structure for receiving a cup-shaped container for a water-soluable plant food. The container is yieldably mounted in and secured to the body structure with an open end projected outwardly from the body structure and closed by a fluidtight cover. The container has an inlet opening adjacent the upper end of its sidewall and an outlet in the bottom wall thereof. The inlet opening is in fluid registration with a controlled water passage means in the body structure and is of a configuration to direct water circumferentially about the container for a spiral flow about the plant food and through the outlet into a ground-inserting nozzle that is attached to the body structure.

PATENTED NOV 9 1971
3,618,539
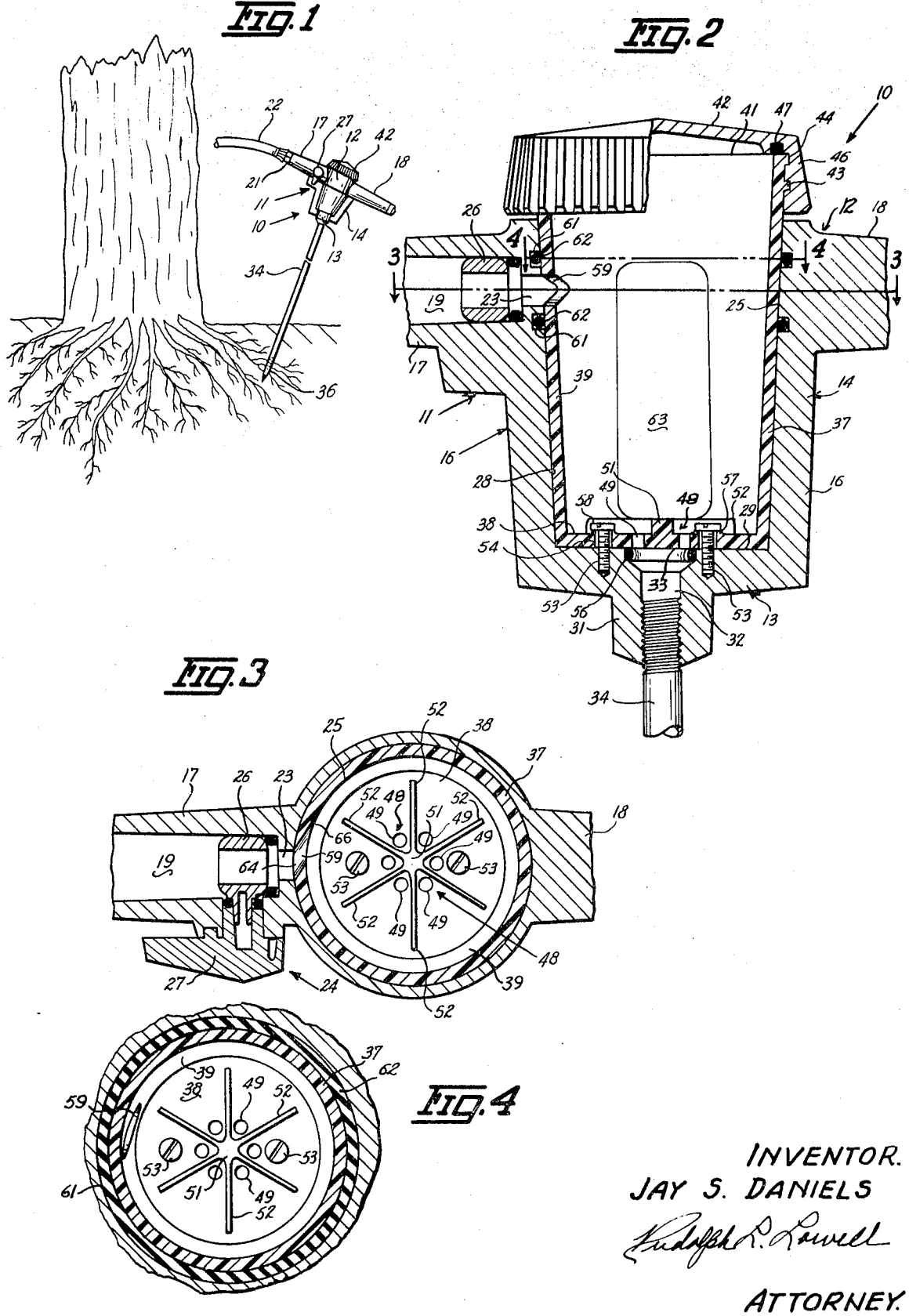
INVENTOR.
JAY S. DANIELS
ATTORNEY.

DEVICE FOR SUPPLYING PLANT FOOD TO PLANT ROOTS

SUMMARY OF THE INVENTION

The device is easily handled for ground insertion of the nozzle and direct control of the water at the point of insertion. The container is simply recharged by merely removing the fluid-tight cover which is readily accessible at the top side of the device. In a recharging operation the device does not have to be removed from the soil and can remain in a previously set plant-feeding position. Fluid seals adjacent the inlet and the outlet of the container rubber-mount or yieldably support the container within the body structure of the device so as to absorb or minimize shock forces applied to the body structure being transmitted directly to the container. The inclination of the axis of the container inlet substantially tangentially of the container side walls spirals the water flow about a cartridge-form plant food within the container. As a result substantially the complete outer surface of the cartridge is continuously acted upon or washed by the water travelling through and around the container prior to flowing into the around-inserting nozzle.

BRIEF DESCRIPTION OF THE DRAWING

FIG. 1 is a perspective view of the plant food supplying device shown about to be inserted into soil;

FIG. 2 is an enlarged foreshortened longitudinal sectional view of the device shown in FIG. 1;

FIG. 3 is a sectional view taken along the line 3—3 of FIG. 2; and

FIG,. 4 is a sectional view as seen along the line 4—4 of FIG. 2.

DETAILED DESCRIPTION OF THE INVENTION

The root-feeding device of this invention, indicated generally as 10 in FIGS. 1 and 2, includes a body structure or main frame 11 that is integrally formed with an upper ring section 12, and a lower disc section 13 interconnected in axial alignment by an intermediate section 14 that consists of a pair of upright oppositely arranged side members 16. The upper ring section 12 includes a pair of diametrically opposite outwardly projected radial arms 17 and 18 of a generally cylindrical shape that serve as handles for inserting and removing the device relative to the soil. An axially extended bore 19 within the arm 17 has an inlet 21 (FIG. 1) connectable with a usual garden hose 22 for receiving water under pressure and an outlet 23 (FIGS. 2 and 3) that is open to the inner peripheral surface 25 of the ring section 12.

A manually controlled water valve unit 24 (FIGS. 2 and 3) has a valve member 26 located in the bore 19 and an operating lever 27 (FIGS. 1 and 3) projected from the arm 17 and movable between full open and closed positions for the valve member 26. The bore 19 and the valve unit 24 thus provide a controlled water passage means in the arm 17.

A container-receiving pocket 28 in the body structure 11 (FIG. 2) is of a generally cylindrical shape tapered inwardly in a downward direction and defined by the inner peripheral surface 25 of the ring section 12, the opposed or facing surfaces of the interconnecting side members 16, and the top surface 29 of the disc section 13. Projected downwardly from the central portion of the disc section 13 is a connector member 31 that has an axial bore 32 open at 33 to the top peripheral surface 29. A water discharge nozzle 34 of a pipe form has a pointed soil-inserting end 36 (FIG. 1) and an upper end secured to the connector member 31 by threadable engagement with the side wall of the bore 32.

Positioned in a relatively snug fit within the container pocket 28 is a transparent plastic container or receptacle 37 of a cup shape having a bottom wall 38, a sidewall 39 and an open upper end 41. With the bottom wall 38 positioned against the top surfaces 29 of the disc section 13 the upper end 41 of the container 37 extends upwardly or outwardly from the ring section 12 to receive in fluidtight engagement a cover or cap member 42.

As best shown in FIG. 2 the sidewall 39 at the upper end of the container has an outer thread 43 engageable with an internal thread 44 on the depending cover flange 46. On tightening of the cover 42 an O-ring 47 positioned therein is clamped between the cover and the upper face or rim of the sidewall 39 to provide a fluid-sealed engagement of the cover 42 with the container 37.

The bottom wall 38 (FIGS. 2 and 3) of the container is formed with a centrally located drain or outlet 48 that is comprised of a series of holes 49, illustrated as six in number, and arranged in a circle that is coaxial with and of a reduced diameter relative to the diameter of the bore 32 in the connector member 31. In other words, each hole 49 opens directly into the bore 32. An upstanding hub 51 within the circle of holes 49 and projected upwardly from the container bottom wall 38 has a plurality of radially extended upright fins or blades 52 corresponding in number to the holes 49. Each fin 52 is located between a pair of adjacent ones of the holes 49.

The container 37 is secured to the body structure 11 by a pair of screws 53 that are inserted through holes 54 in the container bottom wall 38 for threaded engagement with the disc section 13. On tightening of the screws 53 an O-ring 56 arranged within the inlet end 33 of the bore 32 and extended around the circle of holes 49 is clamped between the top surface 29 of the disc section 13 and the lower side of the container bottom wall 38 to form a fluidtight seal between the container drain 48 and the bore 32. With the container 37 formed of a plastic material, each screw hole 54 (FIG. 2) may be formed with an upstanding rim 57 that can be deformed by a corresponding screw head 58 on tightening of the screws 53 so as to positively fluid-seal a hole 54 relative to the interior of the container 37.

Water from the bore or passage means 19 in the arm or handle 17 is admitted into the container 37 through a single container inlet opening 59 (FIGS. 2 and 3) arranged in fluid registration with the outlet 23 of the passage 19. To prevent water from the passage 19 leaking about the container 37 the inner peripheral surface 25 of the ring section 12 is formed with a pair of axially spaced circumferential grooves 61 arranged to opposite sides of the inlet opening 59. Within each groove 61 (FIGS. 2 and 4) is an O-ring 62 which on positioning of the container 37 within its receiving pocket 28 is clamped between the outer peripheral surface of the container side wall 39 and the groove walls. The passage outlet 23 and the container inlet 59 are thus in a fluid-sealed relation with an annular water pocket or chamber that is defined by those portions of the inner peripheral surface 25 of the ring section 12 and the outer peripheral surface of the container 37 located between the O-rings 62.

As thus far described, it is seen that the container 37 has an upper end 41 in a fluid-sealed engagement with the cover member 42, a bottom wall 38 in a fluid-sealed engagement with the top surface 29 of the disk section 13, and a sidewall 39 at the opening 59 in a fluid-sealed engagement with the ring section 12. It will be noted that the fluid-sealed engagements provided by the O-rings 56 and 62 yieldably support the plastic container 37 within the body structure 11. Thus any shock forces that may be applied to the body structure are either absorbed by or are materially reduced by these O-rings and are not applied directly to the container 37 so as to appreciably increase its service life.

In use of the device 10, a supply of plant food 36 is positioned within the container 37. The plant food is illustrated in FIGS. 1 and 2 as being of a cartridge or elongated block form made of water-soluable materials the device 10 while manually supported as the handles 17 and 18 may be initially partially inserted within the soil. The valve unit 24 is then partially opened so that water from the discharge nozzle 34 facilitates the final entry of the nozzle within the soil. After insertion of the nozzle to the desired depth within the soil the valve unit 24 is controlled to admit water into the container 37 at a rate commensurate with soil and moisture conditions and the amount of plant food to be fed to the plant roots.

Referring to FIGS. 2 and 3, it is seen that the axis of the container inlet opening 59 is inclined relative to the axis of the bore 19 in the handle 17 and extends generally tangentially of the container sidewall 39. The outer end 64 of the inlet opening 59 is thus flush with and fully open to the outlet 23 of the passage 19 while its inner end 66 has the center thereof transversely offset relative to the center of the passage outlet 23. As a result water admitted to the container 37 from the outlet 23 is directed by the sidewall of the inlet opening 59 to flow circumferentially within the container during its travel axially of the container for discharge therefrom through the drain holes 49. Stated otherwise, the flow of water downwardly through the container follows a generally spiral path about the cartridge 63 for travel from the container through the drain openings 49.

The peripheral surface of the cartridege 63 is cartridge continuously exposed to substantially the full flow of water through the container 37. By virtue of the cartridge support on the fins or blades 52 the cartridge is spaced above the drain openings 49. The openings are thus unobstructed so that a free flow of water through the container is maintained at all times during a plant-feeding operation. Also, since the container 37 is formed of a transparent plastic material the condition of the cartridge 63 is visually observable at all times. When the device 10 is to be recharged it is only necessary to close the valve unit 24 and remove the cover 42. On placement of a new cartridge within the container 37, the reverse procedure is followed and the device returned to operation without requiring removal from the soil.

I claim:

1. A device for supplying a water-soluble chemical to a preselected location below the ground surface, comprising:
   a. a body member including a ring-shaped upper section, a disk-shaped base section, and a central section interconnecting said upper section and base section in axial alignment,
   b. a container for said water-soluble chemical of a cup shape positioned in said body member with the bottom wall thereof secured to said base section, and the top end thereof projected upwardly from said upper section, said bottom wall having a fluid outlet in the central portion thereof,
   c. a removable cover for the top end of said container,
   d. a pair of diametrically opposite handle members projected radially outwardly from said upper section, one of said handle members formed with a longitudinal bore having an inner end and an outer end,
   e. said container having a sidewall with an opening positioned at the inner end of said bore,
   f. means at said outer end of the bore connectable with a source of water under pressure,
   g. means on said one handle member for controlling the flow of the water through said bore,
   h. said base section having an axial bore therethrough open to the fluid outlet in said bottom wall, and
   i. a ground-inserting nozzle projected within said axial bore and secured to said base section.

2. A device for supplying a plant food to the root system of a plant comprising:
   a. a body member having a container-receiving portion with a flat bottom surface and an upper inner peripheral wall surface,
   b. a container for plant food of a cup shape positionable is said receiving portion having a bottom wall secured to said flat surface, and a sidewall with the upper end thereof projected upwardly from said peripheral wall surface, and outwardly from said body member,
   c. a removable cover means for closing said upper end,
   d. water passage means in said body member having an outlet in said peripheral surface,
   e. means on said body member for controlling the flow of water through said passage means,
   f. said sidewall having an inlet opening positioned at said outlet, and said bottom wall having an outlet portion, and
   g. a ground-inserting nozzle secured to said body member having an inlet portion open to said outlet portion.

3. The device for applying a plant food to the root system of a plant according to claim 2, wherein:
   a. the sidewall of the inlet opening in said container has a side portion thereof extended substantially tangent to the inner peripheral surface of said sidewall whereby to direct water therefrom circumferentially within said container, and
   b. said container bottom wall having upstanding fins extended radially from the outlet portion therein for supporting thereon a water-soluble plant food material of a cartridge form at a position vertically spaced above said outlet portion, whereby the circumferentially directed water flows about and longitudinally of the plant food for travel outwardly of the container through said outlet portion.

* * * * *